(12) United States Patent
Hashimura

(10) Patent No.: US 10,295,952 B2
(45) Date of Patent: May 21, 2019

(54) IMAGE FORMING APPARATUS WITH DUST AND GAS RECOVERY

(71) Applicant: KONICA MINOLTA, INC., Chiyoda-ku, Tokyo (JP)

(72) Inventor: Yoshito Hashimura, Kawasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/814,544

(22) Filed: Nov. 16, 2017

(65) Prior Publication Data
US 2018/0136602 A1    May 17, 2018

(30) Foreign Application Priority Data

Nov. 17, 2016    (JP) .................... 2016-223862

(51) Int. Cl.
| | |
|---|---|
| G03G 21/20 | (2006.01) |
| G03G 21/10 | (2006.01) |
| B01D 46/24 | (2006.01) |
| G03G 15/02 | (2006.01) |
| B01D 46/44 | (2006.01) |
| G03G 21/00 | (2006.01) |

(52) U.S. Cl.
CPC ....... *G03G 21/105* (2013.01); *B01D 46/2411* (2013.01); *G03G 15/0225* (2013.01); *G03G 21/206* (2013.01); *B01D 46/446* (2013.01); *G03G 21/0005* (2013.01); *G03G 21/10* (2013.01)

(58) Field of Classification Search
CPC . G03G 21/105; G03G 15/0225; G03G 21/206
USPC .......................................................... 399/92
See application file for complete search history.

(56) References Cited

U.S. PATENT DOCUMENTS

2012/0252347 A1*  10/2012  Chan .................. G01N 27/64
454/338

FOREIGN PATENT DOCUMENTS

JP      H08220952 A     8/1996

\* cited by examiner

*Primary Examiner* — Susan S Lee
(74) *Attorney, Agent, or Firm* — Cantor Colburn LLP

(57) ABSTRACT

An image forming apparatus includes: a first suction path for sucking and recovering dust from a place where the dust is generated; and a second suction path for sucking and recovering a predetermined gas from a place where the gas is generated, wherein the first suction path includes a first filter that collects the dust, a first suction fan provided downstream of the first filter, and an exhaust path of the first suction path, the second suction path includes a second filter that collects the gas, a second suction fan provided downstream of the second filter, and an exhaust path of the second suction path, and a connection in which the exhaust path of the first suction path is connected upstream of the second filter in the second suction path is included.

10 Claims, 10 Drawing Sheets

(Prior Art)

IMAGE FORMING APPARATUS WITH DUST AND GAS RECOVERY

CROSS REFERENCE TO RELATED APPLICATION

The present invention claims priority under 35 U.S.C. § 119 to Japanese Application No. 2016-223862 filed Nov. 17, 2016, the entire content of which is incorporated herein by reference.

BACKGROUND

Technological Field

The present invention relates to an image forming apparatus.

Description of the Related Art

Conventionally, in an electrophotographic image forming apparatus, toner scatters in the apparatus and ozone is generated, and thus a mechanism to recover the toner and the ozone is provided.

For example, as illustrated in FIG. 10, ozone G is generated when a photosensitive drum 81 is charged by a charger 82, and scattered toner (hereinafter, simply referred to as toner) T is generated when a toner image is formed on the photosensitive drum 81 by a developer 83. Therefore, an image forming apparatus (hereinafter, referred to as conventional configuration A) is used in which a toner filter 84 and an ozone filter 85 are provided in series and a common suction fan 86 is used to suck the toner T and the ozone G in the same path (see JP 8-220952 A).

In addition, with realization of multi-color and high-speed of the image forming apparatus, improvement of suction performance for the toner and ozone is required, and thus securing of a wind speed for sucking both the toner and ozone is difficult with a single suction fan. Therefore, as illustrated in FIG. 11, a configuration (hereinafter, referred to as conventional configuration B) is employed in which functions to suck the toner T and to suck the ozone G are separated. In the conventional configuration B, toner T generated when a toner image is formed on a photosensitive drum 91 by a developer 93 is recovered using a toner filter 94 and a toner suction fan 95, and ozone G generated when the photosensitive drum 91 is charged by a charger 92 is recovered using an ozone filter 96 and an ozone suction fan 97.

However, in the conventional configuration A illustrated in FIG. 10, the suction path of the toner T and the suction path of the ozone G join upstream of the toner filter 84. Therefore, there is a problem that, when the toner filter 84 is clogged, the suction wind speed is decreased, and both the toner T and the ozone G cannot be sucked. In a case where the toner filter 84 and the ozone filter 85 are integrally formed, the whole filter is replaced in accordance with the filter having a shorter lifetime, and thus the filter having a longer lifetime cannot be used up. Further, when toner adheres to the ozone filter 85, oxidized odor may be generated, and thus there are design restrictions such as disposing the toner filter 84 on the upstream side.

Further, in the conventional configuration B illustrated in FIG. 11, the suction of the toner T and the suction of the ozone G are performed in different paths, but since a region where the toner T is generated and a region where the ozone G is generated are close to each other, there is a problem that the ozone G is sucked at the time of sucking the toner T. Since particles of the toner T are larger in mass than the ozone G, force to suck the toner T is stronger, and the ozone G is easily mixed in the toner suction path side. The mixed ozone G is discharged to an outside of the apparatus without passing through the ozone filter 96.

SUMMARY

The present invention has been made in view of the above problems of the conventional technologies, and an object of the present invention is to avoid becoming less able to suck a gas when a filter that collects dust is clogged, and to remove the gas sucked together with the dust without increasing a special filter, in an image forming apparatus that sucks and recovers dust and a gas.

To achieve the abovementioned object, according to an aspect of the present invention, an image forming apparatus reflecting one aspect of the present invention comprises: a first suction path for sucking and recovering dust from a place where the dust is generated; and a second suction path for sucking and recovering a predetermined gas from a place where the gas is generated, wherein the first suction path includes a first filter that collects the dust, a first suction fan provided downstream of the first filter, and an exhaust path of the first suction path, the second suction path includes a second filter that collects the gas, a second suction fan provided downstream of the second filter, and an exhaust path of the second suction path, and a connection in which the exhaust path of the first suction path is connected upstream of the second filter in the second suction path is included.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

[First Embodiment]

First, a first embodiment of an image forming apparatus according to the present invention will be described with reference to the drawings.

Figure 1:
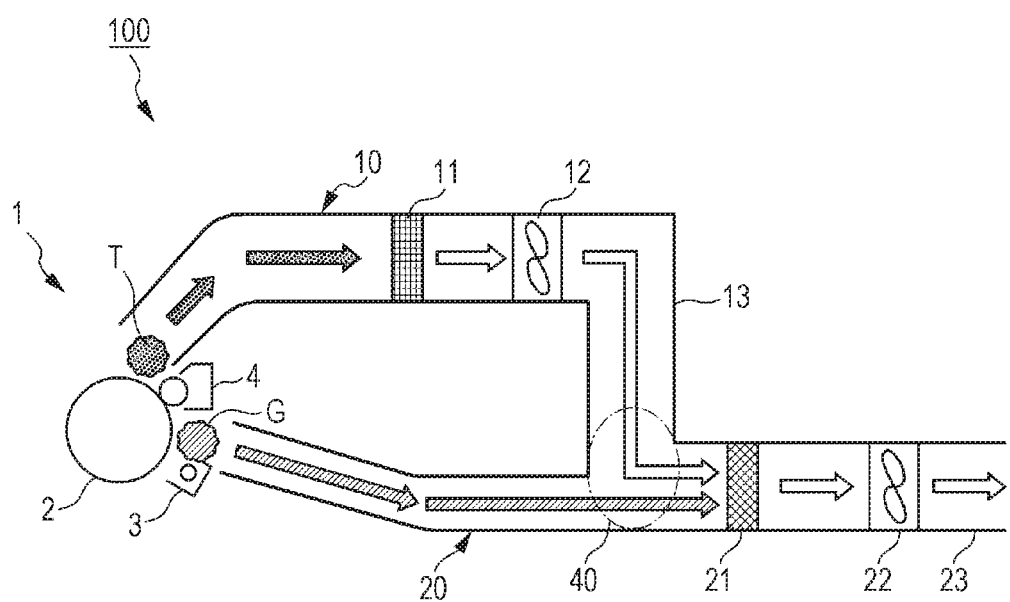
FIG. 1 is a schematic diagram illustrating a schematic configuration of an image forming apparatus according to a first embodiment of the present invention.

FIG. 1 is a schematic diagram illustrating a schematic configuration of an image forming apparatus 100 in the first embodiment. The image forming apparatus 100 is an electrophotographic image forming apparatus. The image forming apparatus 100 includes an image forming unit 1, a first suction path 10, a second suction path 20, a connection 40, and the like.

The image forming unit 1 includes a photosensitive drum 2 as an image carrier, a charger 3, an exposure unit (not illustrated), a developer 4, a transfer unit (not illustrated), a cleaner (not illustrated), a fixing unit (not illustrated), etc., and forms an image on a sheet. The charger 3 uniformly charges the photosensitive drum 2. The exposure unit exposes the charged photosensitive drum 2 to form an electrostatic latent image. The developer 4 supplies toner to the photosensitive drum 2 to develop the electrostatic latent image on the photosensitive drum 2 to form a toner image. The transfer unit directly or indirectly transfers the toner image formed on the photosensitive drum 2 onto the sheet. The cleaner removes the toner from the photosensitive drum 2 after the transfer. The fixing unit heats and pressurizes the sheet to which the toner image has been transferred to fix the toner image on the sheet.

Near the developer 4, toner T as dust scattered from the developer 4 is generated.

Near the charger 3, ozone G as a predetermined gas is generated.

The first suction path 10 is a path for sucking and recovering the toner T from the places where the toner T is generated, such as the developer 4 and the cleaner. The first suction path 10 has an opening near the developer 4 or the cleaner.

The first suction path 10 includes a toner filter 11 as a first filter, a first suction fan 12, and an exhaust path 13. The toner filter 11 collects the toner T contained in the air sucked through a suction port of the first suction path 10. The first suction fan 12 is provided downstream of the toner filter 11, and sucks the air into the first suction path 10. The exhaust path 13 discharges the air sucked by the first suction fan 12.

The second suction path 20 is a path for sucking and recovering the ozone G from the places where the ozone G is generated, such as the charger 3 and the transfer unit. The second suction path 20 has an opening near the charger 3 or the transfer unit.

The second suction path 20 includes an ozone filter 21 as a second filter, a second suction fan 22, and an exhaust path 23. The ozone filter 21 collects the ozone G included in the air suctioned through a suction port of the second suction path 20 and the air that passes through the exhaust path 13 of the first suction path 10 and joins the second suction path 20 at the connection 40. The second suction fan 22 is provided downstream of the ozone filter 21, and sucks the air into the second suction path 20 and the first suction path 10. The exhaust path 23 discharges the air sucked by the second suction fan 22.

The connection 40 is a portion where the exhaust path 13 of the first suction path 10 is connected upstream of the ozone filter 21 in the second suction path 20. In the connection 40, the air discharged from the first suction path 10 and the air sucked through the suction port of the second suction path 20 join and head toward the ozone filter 21.

Figure 2:
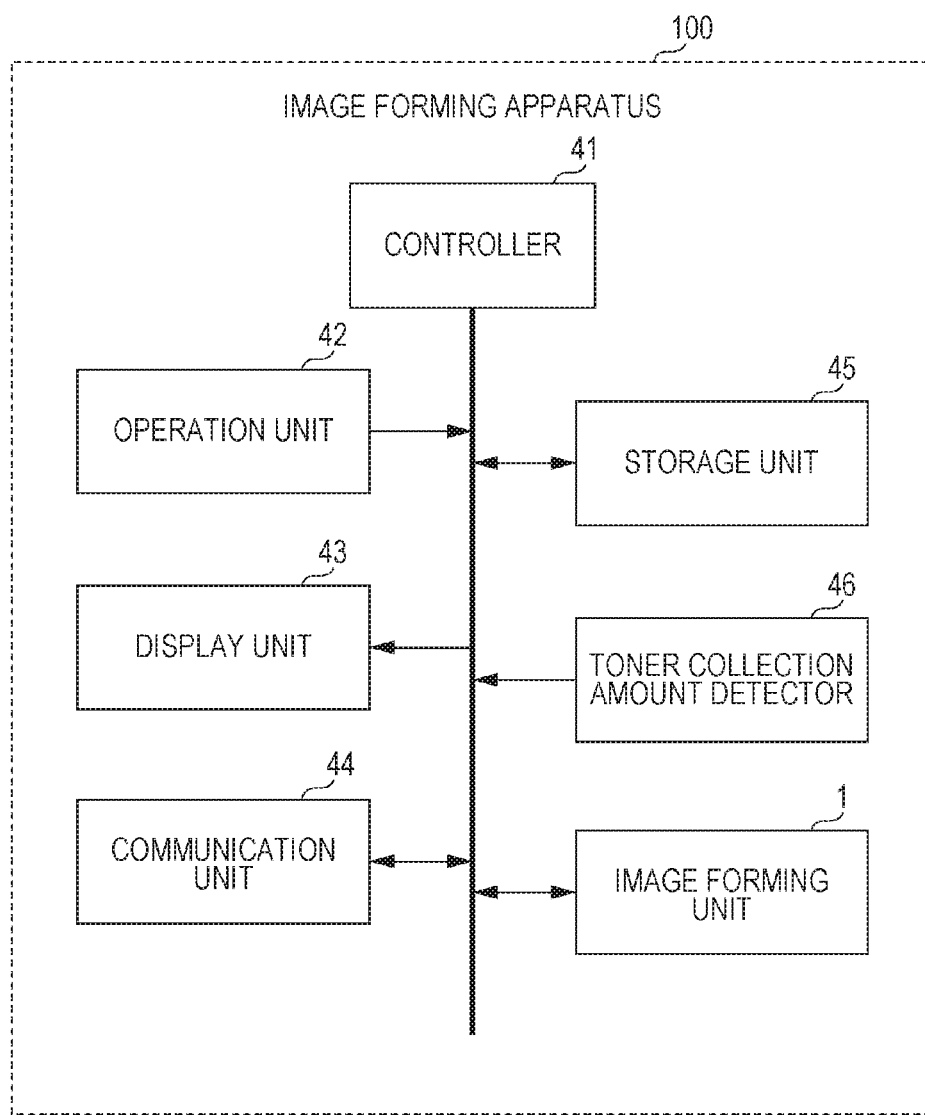
FIG. 2 is a block diagram illustrating a main functional configuration of the image forming apparatus.

FIG. 2 is a block diagram illustrating a main functional configuration of the image forming apparatus 100. The image forming apparatus 100 includes a controller 41, an operation unit 42, a display unit 43, a communication unit 44, a storage unit 45, a toner collection amount detector 46, an image forming unit 1, and the like, and the units are connected by a bus.

The controller 41 includes a central processing unit (CPU), a read only memory (ROM), a random access memory (RAM), and the like. The CPU reads out a system program and various processing programs stored in the ROM according to an operation signal input from the operation unit 42 or an instruction signal received by the communication unit 44, expands the system program and various processing programs into the RAM, and performs centralized control of operations of the units of the image forming apparatus 100 according to the expanded programs.

The operation unit 42 includes a touch panel formed to cover a display screen of the display unit 43 and various operation buttons, and outputs an operation signal based on a user operation to the controller 41.

The display 43 is configured from a liquid crystal display (LCD), and displays states of the various operation buttons and the apparatus, and operation statuses of functions on the display screen according to a display signal input from the controller 41.

The communication unit 44 exchanges data with an external device connected to a communication network such as a local area network (LAN).

The storage unit 45 is configured from a hard disk, a flash memory, or the like, and stores various data.

The toner collection amount detector 46 detects the amount of the toner T (hereinafter, referred to as toner collection amount) collected by the toner filter 11, and outputs the detection result to the controller 41. That is, the toner collection amount detector 46 functions as a dust collection amount detector. For example, a sensor that detects contamination on a surface of the toner filter 11 or contamination on an inner surface of a duct upstream of the toner filter 11 can be used as the toner collection amount detector 46. Further, the toner collection amount detector 46 may estimate the toner collection amount from the number of image formation sheets, or estimate the toner collection amount from variation of a rotation speed of the first suction fan 12.

In a method using the rotation speed of the first suction fan 12, when clogging occurs in the toner filter 11, the amount of air that can pass through the first suction path 10 is decreased and a load applied to blades of the first suction fan 12 is decreased, and thus the rotation speed of the first suction fan 12 is increased. Therefore, the toner collection amount by the toner filter 11 can be estimated according to the rotation speed of the first suction fan 12.

The controller 41 changes the rotation speed of the first suction fan 12 and/or the second suction fan 22 according to the toner collection amount detected by the toner collection amount detector 46. That is, the controller 41 functions as a fan controller. Specifically, the controller 41 increases the rotation speeds of the first suction fan 12 and the second suction fan 22 with an increase in the toner collection amount. For example, the rotation speed of the first suction fan 12 and the rotation speed of the second suction fan 22 are stored in advance in the storage unit 45 for each of a plurality of stages of the toner collection amount, and the controller 41 reads the rotation speed corresponding to the detected toner collection amount to control the rotation speeds of the first suction fan 12 and the second suction fan 22.

The controller 41 controls the rotation speeds of the first suction fan 12 and the second suction fan 22 so that a flow rate Q2 of the second suction fan 22 becomes larger than a flow rate Q1 of the first suction fan 12.

Next, an operation in the image forming apparatus 100 according to the first embodiment will be described.

Figure 3:
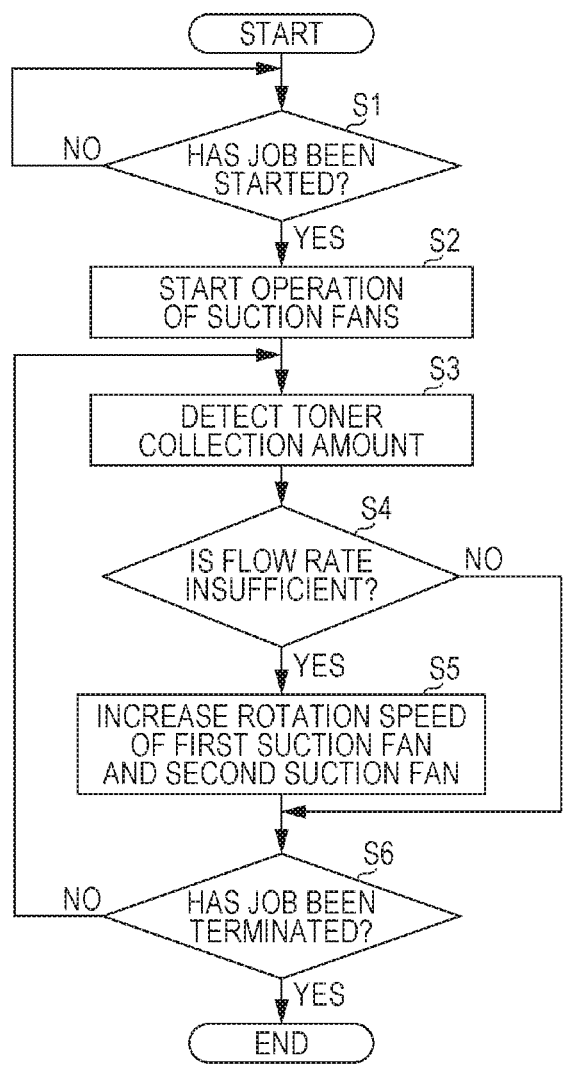
FIG. 3 is a flowchart illustrating a first suction process.

FIG. 3 is a flowchart illustrating a first suction process executed by the image forming apparatus 100.

First, the controller 41 determines whether a job has been started (step S1), and repeats the process of step S1 while keeping a standby state when the job has not been started (NO in step S1).

When the job has been started (YES in step S1), the controller 41 starts the operations of the first suction fan 12 and the second suction fan 22 (step S2). Here, the controller 41 controls the rotation speeds of the first suction fan 12 and the second suction fan 22 to satisfy Q1<Q2.

Next, the controller 41 acquires the toner collection amount detected by the toner collection amount detector 46 (step S3).

Here, the controller 41 determines whether the flow rate in the first suction path 10 or the second suction path 20 is insufficient on the basis of the toner collection amount (step S4). Note that the controller 41 may determine whether the flow rate is insufficient from a measurement result of a flow meter for measuring the flow rate.

When the flow rate in the first suction path 10 or the second suction path 20 is insufficient (YES in step S4), the controller 41 increases the rotation speeds of the first suction fan 12 and the second suction fan 22 to increase the flow rate according to the toner collection amount (step S5). Specifically, the controller 41 increases the rotation speeds of the first suction fan 12 and the second suction fan 22 with an increase in the toner collection amount.

For example, the controller 41 may first increase only the rotation speed of the first suction fan 12 within the range of Q1<Q2 in the relationship between the flow rate Q1 of the first suction fan 12 and the flow rate Q2 of the second suction fan 22, and then increase the rotation speed of the second suction fan 22 not to cause Q1≥Q2.

Further, the controller 41 may change only the rotation speed of the second suction fan 22, or may change both the rotation speed of the first suction fan 12 and the rotation speed of the second suction fan 22, in accordance with variation of the amounts of the toner T and the ozone G generated due to coverage of an image to be formed, an environment, etc.

In step S4, when the flow rates in the first suction path 10 and the second suction path 20 are not insufficient (NO in step S4), or after step S5, the controller 41 determines whether the job has been terminated (step S6). When the job has not been terminated (NO in step S6), the process is returned to step S3 and is repeated.

In step S6, when the job has been terminated (YES in step S6), the first suction process is terminated.

As described above, according to the image forming apparatus 100 of the first embodiment, the exhaust path 13 of the first suction path 10 is connected upstream of the ozone filter 21 in the second suction path 20. Therefore, becoming less able to suck the ozone G can be avoided when the toner filter 11 is clogged in the image forming apparatus 100 that sucks and recovers the toner T and the ozone G.

Further, even if a part of the ozone G is sucked together with the toner T to the side of the first suction path 10, such ozone G can be removed without increasing a special filter.

Further, since the flow rate Q2 of the second suction fan 22 is larger than the flow rate Q1 of the first suction fan 12, occurrence of a reverse flow in the suction path can be prevented.

Further, the rotation speed of the first suction fan 12 and/or the second suction fan 22 is changed according to the toner collection amount detected by the toner collection amount detector 46. Therefore, the flow rates of the first suction fan 12 and the second suction fan 22 can be maintained regardless of change of a pressure loss of the toner filter 11.

In the first suction path 10, a cyclone for centrifugally separating the toner T may be provided upstream of the toner filter 11. With the cyclone, the amount of toner in the upstream of the toner filter 11 can be reduced. Further, when the cyclone is provided, the pressure loss is large, and thus the flow rate in the first suction path 10 needs to be increased. For this reason, the configuration in which the second suction fan 22 sucks the air in the first suction path 10 via the connection 40, like the image forming apparatus 100, is suitable.

[Second Embodiment]

Next, a second embodiment to which the present invention is applied will be described.

Figure 4:
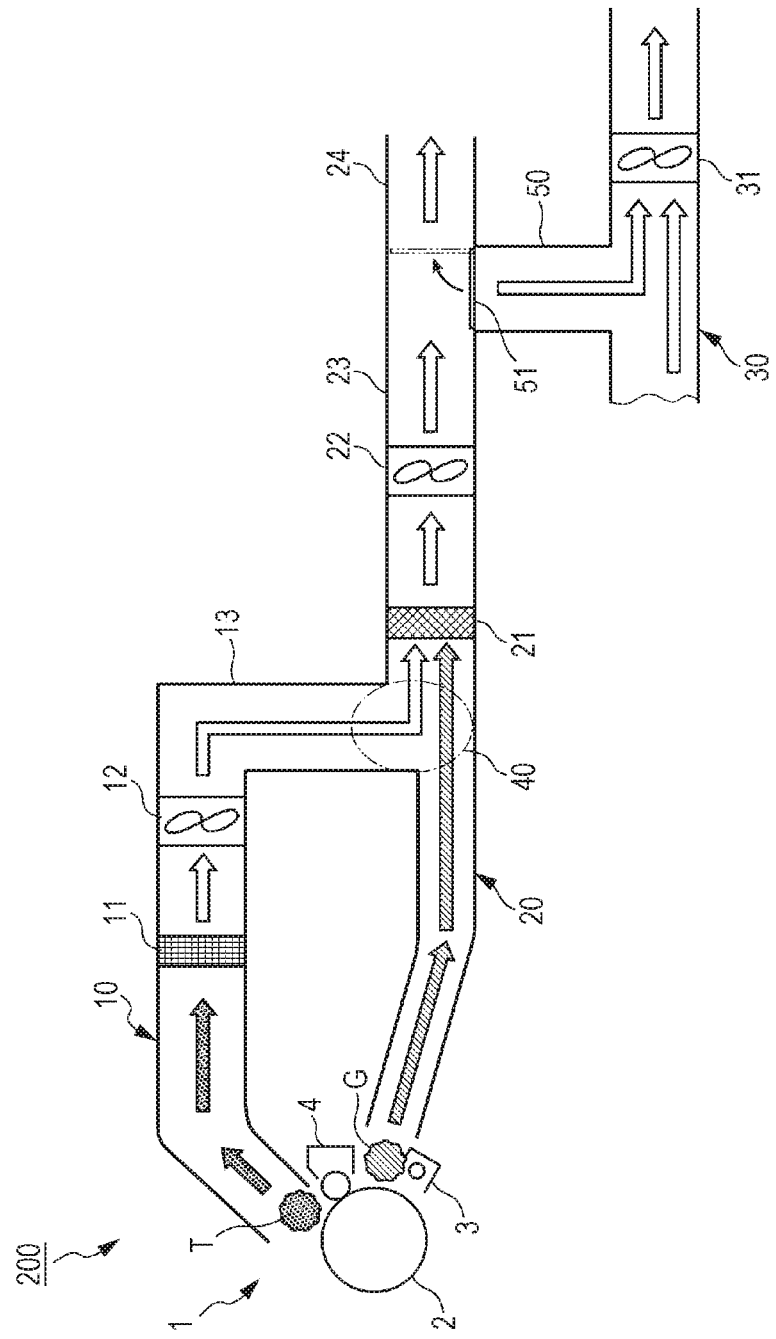
FIG. 4 is a schematic diagram illustrating a schematic configuration of an image forming apparatus according to a second embodiment of the present invention.

FIG. 4 is a schematic diagram illustrating a schematic configuration of an image forming apparatus 200 according to the second embodiment of the present invention. The image forming apparatus 200 includes a third suction path 30, a first bypass path 50, and a first switching valve 51, in addition to a similar configuration to the image forming apparatus 100 (see FIG. 1) described in the first embodiment.

Further, a functional configuration of the image forming apparatus 200 is similar to that in FIG. 2, and thus FIG. 2 is cited.

Hereinafter, regarding the image forming apparatus 200, description of the similar configuration to the image forming apparatus 100 is omitted, and the characteristic configuration and processing of the second embodiment will be described.

The third suction path 30 includes a third suction fan 31 for discharging a gas in the image forming apparatus 200 to an outside of the apparatus.

The first bypass path 50 is a path branching from an exhaust path 23 of a second suction path 20 and joining upstream of the third suction fan 31 in the third suction path 30.

The first switching valve 51 is a first switch that switches a path 24 directly leading from the exhaust path 23 of the second suction path 20 to the outside of the apparatus, and the first bypass path 50.

When a toner collection amount detected by a toner collection amount detector 46 reaches a first predetermined amount, the controller 41 controls the first switching valve 51 to switch the path 24 leading from the exhaust path 23 of the second suction path 20 to the outside of the apparatus, to the first bypass path 50. The first predetermined amount is stored in advance in a storage unit 45.

The controller 41 controls rotation speeds of a first suction fan 12, a second suction fan 22, and the third suction fan 31 such that, in the relationship among a flow rate Q1 of the first suction fan 12, a flow rate Q2 of the second suction fan 22, and a flow rate Q3 of the third suction fan 31, the flow rate Q3 of the third suction fan 31 of when the first bypass path 50 is used satisfies Q1<Q2<Q3.

Next, an operation of the image forming apparatus 200 according to the second embodiment will be described.

Figure 5:
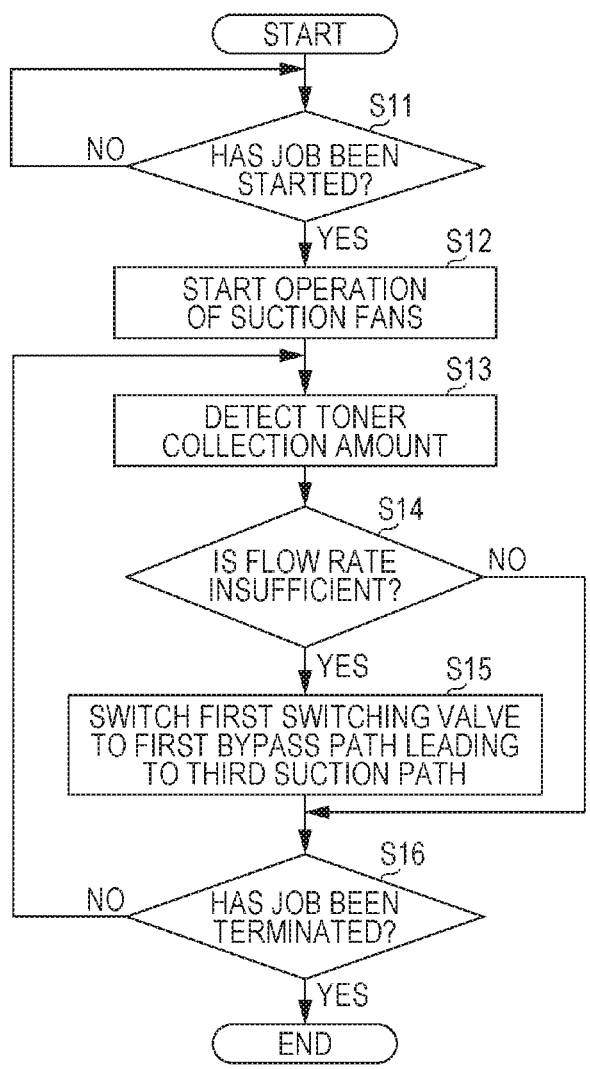
FIG. 5 is a flowchart illustrating a second suction process.

FIG. 5 is a flowchart illustrating a second suction process executed by the image forming apparatus 200. At the start of the second suction process, the first switching valve 51 is switched to the side of the path 24 leading from the exhaust path 23 of the second suction path 20 to the outside of the apparatus.

Since processes in steps S11 to S13 are similar to the processes in steps S1 to S3 in FIG. 3, description is omitted.

After step S13, the controller 41 determines whether the flow rate in the first suction path 10 or the second suction path 20 is insufficient on the basis of the toner collection amount detected by the toner collection amount detector 46 (step S14). Specifically, the controller 41 determines whether the toner collection amount has reached the first predetermined amount.

When the flow rate in the first suction path 10 or the second suction path 20 is insufficient (YES in step S14), that is, when the toner collection amount has reached the first predetermined amount, the controller 41 controls the first switching valve 51 to switch a state connected to the path 24 leading from the exhaust path 23 of the second suction path 20 to the outside of the apparatus, to a state connected with the first bypass path 50 leading to the third suction path 30 (step S15). Here, the controller 41 controls the rotation speeds of the first suction fan 12, the second suction fan 22, and the third suction fan 31 to satisfy $Q1<Q2<Q3$.

When the flow rates in the first suction path 10 and the second suction path 20 are not insufficient (NO in step S14), that is, when the toner collection amount is less than the first predetermined amount in step S14, or after step S15, the controller 41 determines whether the job has been terminated (step S16). When the job has not been terminated (NO in step S16), the process is returned to step S13 and is repeated.

Note that when the flow rate becomes insufficient again once after the first switching valve 51 is switched to the first bypass path 50 side, the process of step S15 cannot be executed, and thus the rotation speed of the third suction fan 31 may be increased.

In step S16, when the job has been terminated (YES in step S16), the second suction process is terminated.

As described above, according to the image forming apparatus 200 of the second embodiment, the exhaust path 13 of the first suction path 10 is connected upstream of the ozone filter 21 in the second suction path 20. Therefore, becoming less able to suck the ozone G can be avoided when the toner filter 11 is clogged in the image forming apparatus 200 that sucks and recovers the toner T and the ozone G.

Further, even if a part of the ozone G is sucked together with the toner T to the side of the first suction path 10, such ozone G can be removed without increasing a special filter.

In response to the conventional problem that the flow rate Q1 of the first suction fan 12 is decreased due to clogging of the toner filter 11, and the flow rate Q2 of the second suction fan 22 is decreased accordingly, the first switching valve 51 is switched to the first bypass path 50, whereby the flow rate Q1 of the first suction fan 12 and the flow rate Q2 of the second suction fan 22 can be supported by the third suction fan 31.

Further, since the flow rate Q2 of the second suction fan 22 is larger than the flow rate Q1 of the first suction fan 12, and the flow rate Q3 of the third suction fan 31 is larger than the flow rate Q2 of the second suction fan 22, occurrence of a reverse flow in the suction path can be prevented.

In the second embodiment, the first switching valve 51 is switched to the first bypass path 50 leading to the third suction path 30 when the flow rate in the first suction path 10 or the second suction path 20 is insufficient. However, in addition, the rotation speeds of the first suction fan 12 and the second suction fan 22 may be increased, similarly to the first embodiment.

[Third Embodiment]

Next, a third embodiment to which the present invention is applied will be described.

Figure 6:
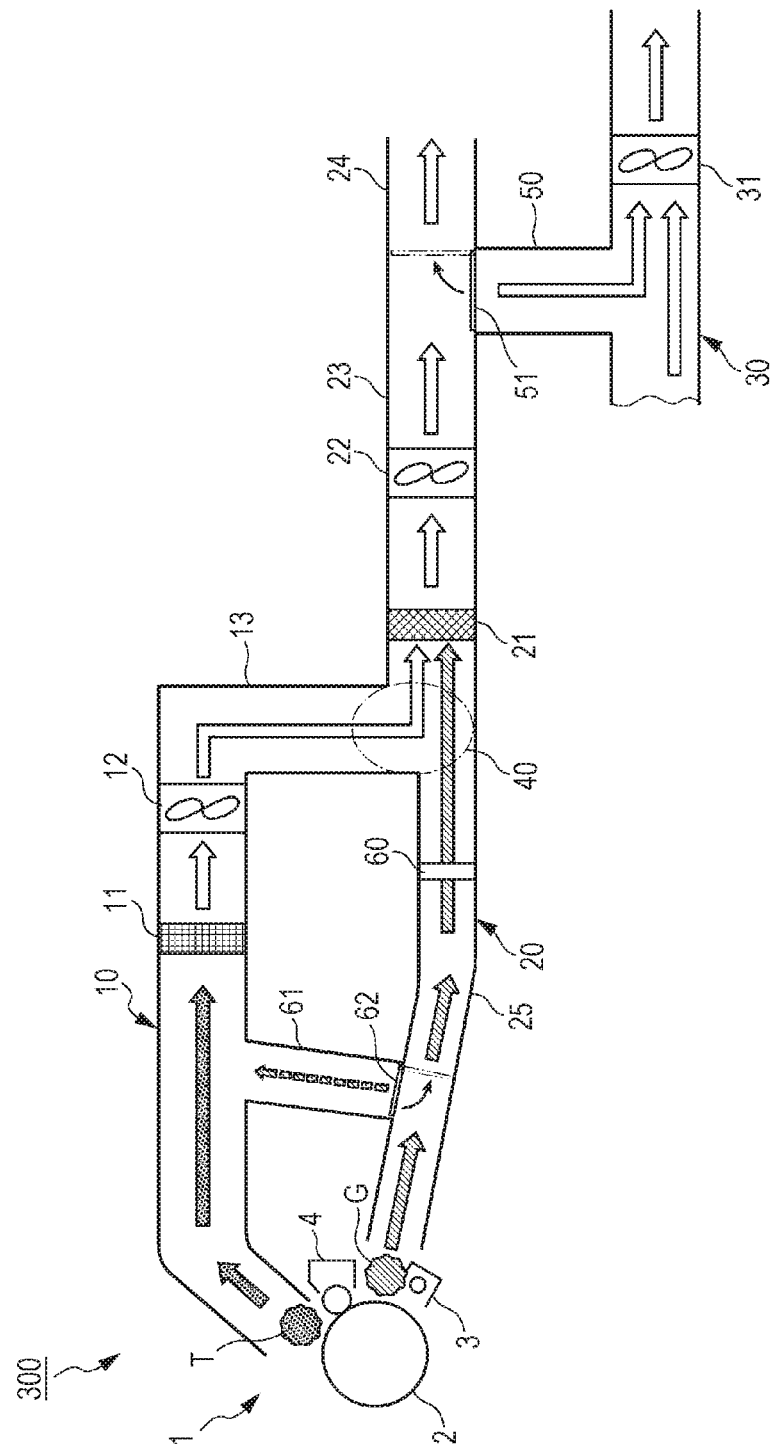
FIG. 6 is a schematic diagram illustrating a schematic configuration of an image forming apparatus according to a third embodiment of the present invention.

FIG. 6 is a schematic diagram illustrating a schematic configuration of an image forming apparatus 300 according to the third embodiment. The image forming apparatus 300 includes a shutter 60, a second bypass path 61, and a second switching valve 62, in addition to a similar configuration to the image forming apparatus 200 (see FIG. 4) described in the second embodiment.

Further, a functional configuration of the image forming apparatus 300 is similar to that in FIG. 2, and thus FIG. 2 is cited.

Hereinafter, regarding the image forming apparatus 300, description of the similar configuration to the image forming apparatus 200 is omitted, and the characteristic configuration and processing of the third embodiment will be described.

The shutter 60 is provided in a path upstream of a connection 40 in a second suction path 20, and changes an opening area of the path. The shutter 60 can stepwise block the flow path.

The second bypass path 61 is a path branching upstream of the shutter 60 in the second suction path 20 and joining upstream of a toner filter 11 in a first suction path 10.

The second switching valve 62 is a second switch that switches a path 25 leading from the branch position upstream of the shutter 60 to the shutter 60 in the second suction path 20, and the second bypass path 61.

A controller 41 changes a rotation speed of a first suction fan 12 and/or a second suction fan 22 according to a toner collection amount detected by a toner collection amount detector 46.

The controller 41 controls the rotation speeds of the first suction fan 12 and the second suction fan 22 so that a flow rate Q2 of the second suction fan 22 becomes larger than a flow rate Q1 of the first suction fan 12.

When a toner collection amount detected by a toner collection amount detector 46 reaches a first predetermined amount, the controller 41 controls the first switching valve 51 to switch the path 24 leading from the exhaust path 23 of the second suction path 20 to the outside of the apparatus, to the first bypass path 50.

The controller 41 controls rotation speeds of a first suction fan 12, a second suction fan 22, and the third suction fan 31 such that, in the relationship among a flow rate Q1 of the first suction fan 12, a flow rate Q2 of the second suction fan 22, and a flow rate Q3 of the third suction fan 31, the flow rate Q3 of the third suction fan 31 of when the first bypass path 50 is used satisfies $Q1<Q2<Q3$.

The controller 41 controls the shutter 60 according to an increase in the rotation speed of the second suction fan 22 or switching to the first bypass path 50 at the first switching valve 51 to narrow an opening area of the path upstream of the connection 40 in the second suction path 20. Specifically, a control value of the shutter 60 is stored in advance in a storage unit 45 for every timing of the increase in the rotation speed of the second suction fan 22 and the switching timing to the first bypass path 50 at the first switching valve 51, and the controller 41 controls the shutter 60 according to the timing to change the opening area of the second suction path 20.

In a case where the toner filter 11 cannot be used, to be specific, when the toner collection amount detected by the toner collection amount detector 46 has reached a second predetermined amount (the second predetermined amount>a first predetermined amount), the controller 41 controls the second switching valve 62 to switch the path 25 leading from the branch position upstream of the shutter 60 to the shutter 60 in the second suction path 20, to the second bypass path 61. The second predetermined amount is stored in advance in the storage unit 45.

Next, an operation of the image forming apparatus 300 according to the third embodiment will be described.

Figure 7:
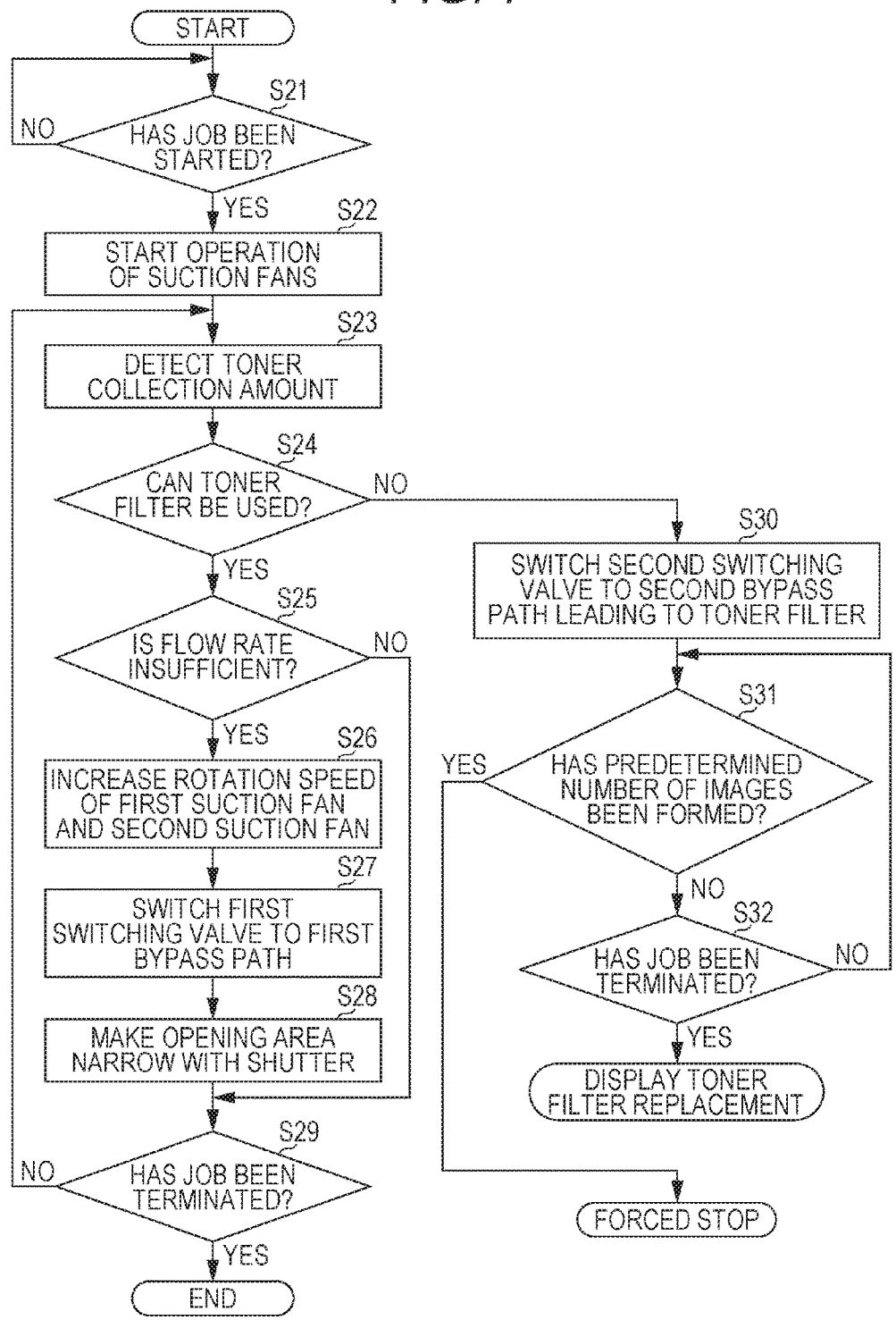
FIG. 7 is a flowchart illustrating a third suction process.

FIG. 7 is a flowchart illustrating a third suction process executed by the image forming apparatus 300. At the start of the third suction process, the first switching valve 51 is switched to the side of the path 24 from the exhaust path 23 of the second suction path 20 to the outside of the apparatus directly, and the second switching valve 62 is switched to the side of the path 25 leading from the branch position upstream of the shutter 60 to the shutter 60 in the second suction path 20.

Since processes in steps S21 to S23 are similar to the processes in steps S11 to S13 in FIG. 5, description is omitted.

After step S23, the controller 41 determines whether the toner filter 11 can be used on the basis of the toner collection amount detected by the toner collection amount detector 46 (step S24). Specifically, the controller 41 determines that the toner filter 11 cannot be used when the toner collection amount reaches the second predetermined amount.

When the toner filter 11 can be used (YES in step S24), that is, when the toner collection amount is less than the second predetermined amount, the controller 41 determines whether the flow rate in the first suction path 10 or the second suction path 20 is insufficient on the basis of the toner collection amount (step S25).

When the flow rate in the first suction path 10 or the second suction path 20 is insufficient (YES in step S25), the controller 41 increases the rotation speeds of the first suction fan 12 and the second suction fan 22 to increase the flow rate (step S26). Here, the controller 41 controls the rotation speeds of the first suction fan 12 and the second suction fan 22 to satisfy Q1<Q2.

Further, when the toner collection amount has reached the first predetermined amount, the controller 41 controls the first switching valve 51 to switch a state connected to the path 24 leading from the exhaust path 23 of the second suction path 20 to the outside of the apparatus, to a state connected to the first bypass path 50 leading to the third suction path 30 (step S27). Further, the controller 41 may further increase the rotation speed of the third suction fan 31 to eliminate the insufficiency of the flow rate. Here, the controller 41 controls the rotation speeds of the first suction fan 12, the second suction fan 22, and the third suction fan 31 to satisfy Q1<Q2<Q3.

Further, the controller 41 controls the shutter 60 according to an increase in the rotation speed of the second suction fan 22 or switching to the first bypass path 50 at the first switching valve 51 to narrow the opening area of the path upstream of the connection 40 in the second suction path 20 (step S28).

Note that all the processes in steps S26 to S28 may not be performed and the processes may be selectively and stepwisely performed according to the degree of insufficient flow rate. For example, only the process of step S26 may be performed in an initial stage, the processes of steps S26 and S28 may be performed in the next stage, only the process of step S27 may be performed in the next stage, and the process of step S28 may be performed in the next stage.

In step S25, when the flow rates in the first suction path 10 and the second suction path 20 are not insufficient (NO in step S25), or after step S28, the controller 41 determines whether the job has been terminated (step S29). When the job has not been terminated (NO in step S29), the process is returned to step S23 and is repeated.

In step S29, when the job has been terminated (YES in step S29), the third suction process is terminated.

When the toner filter 11 cannot be used (NO in step S24), that is, when the toner collection amount has reached the second predetermined amount in step S24, the controller 41 controls the second switching valve 62 to switch a state connected to the path 25 leading from the branch position upstream of the shutter 60 (a section in which the opening area is changeable) to the shutter 60 in the second suction path 20, to a state connected to the second bypass path 61 leading to the toner filter 11 (step S30).

Next, the controller 41 determines whether a predetermined number of images has been formed after switching to the second bypass path 61 (step S31). When the predetermined number of images has been formed (YES in step S31), the controller 41 forcibly stops the image forming apparatus 300.

When the predetermined number of images has been formed in step S31 (NO in step S31), the controller 41 determines whether the job has been terminated (step S32). When the job has not been terminated (NO in step S32), the process is returned to step S31 and is repeated.

In step S32, when the job has been terminated (YES in step S32), the controller 41 causes a display unit 43 to display an instruction to replace the toner filter 11.

As described above, according to the image forming apparatus 300 of the third embodiment, the shutter 60 is provided in the path upstream of the connection 40 in the second suction path 20, and thus an excessive increase in the flow rate of the second suction fan 22 can be prevented even when the rotation speed of the second suction fan 22 is increased, in addition to a similar effect to the second embodiment.

When clogging of the toner filter 11 progresses and the rotation speed of the second suction fan 22 is increased, toner T is mixed into an ozone suction path (the second suction path 20) side. However, the opening area is narrowed by the shutter 60 to adjust the flow rate of the second suction path 20.

In a case where the toner T is mixed in the second suction path 20 due to the clogging of the toner filter 11, the second suction path 20 is closed by the shutter 60, and the path is switched to the second bypass path 61, whereby discharge of the toner T into the outside of the apparatus without through the toner filter 11 can be prevented. In this case, since the toner filter 11 is in a state close to the end of its life, the apparatus is forcefully stopped after executing formation of a predetermined number of images.

[Fourth Embodiment]

Next, a fourth embodiment to which the present invention is applied will be described.

Figure 8:
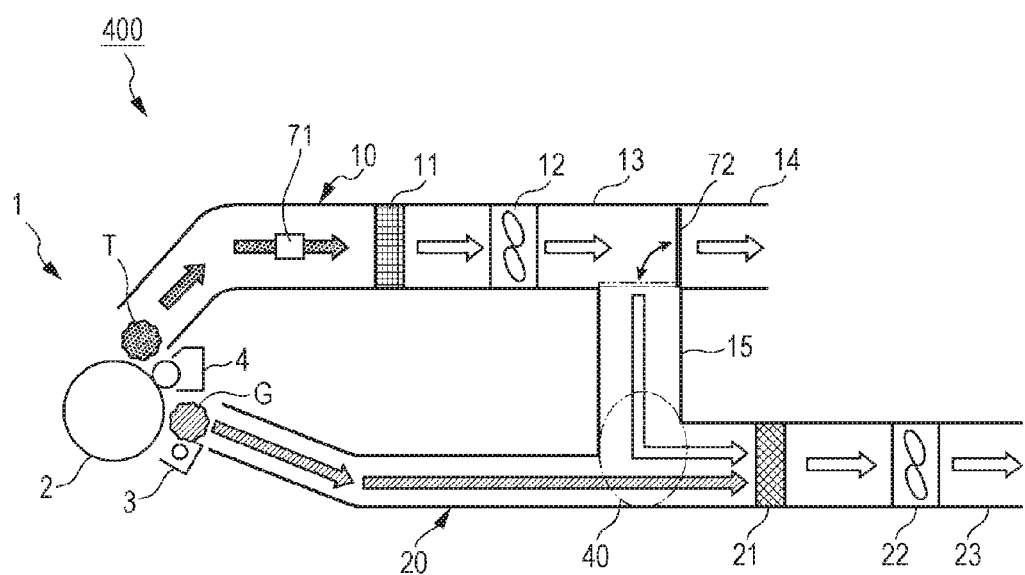
FIG. 8 is a schematic diagram illustrating a schematic configuration of an image forming apparatus according to a fourth embodiment of the present invention.

FIG. 8 is a schematic diagram illustrating a schematic configuration of an image forming apparatus 400 according to the fourth embodiment. The image forming apparatus 400 includes an ozone sensor 71, an external exhaust path 14, and a third switching valve 72, in addition to a similar configuration to the image forming apparatus 100 (see FIG. 1) described in the first embodiment.

Further, a functional configuration of the image forming apparatus 400 is similar to that in FIG. 2, and thus FIG. 2 is cited.

Hereinafter, regarding the image forming apparatus 400, description of the similar configuration to the image forming apparatus 100 is omitted, and the characteristic configuration and processing of the fourth embodiment will be described.

The ozone sensor 71 is a gas detector provided upstream of a toner filter 11 in a first suction path 10 and which detects an amount of ozone G.

The external exhaust path 14 is a path branching from an exhaust path 13 at the downstream of a first suction fan 12 of the first suction path 10, and directly leading to an outside of the apparatus.

The third switching valve 72 is a third switch that switches a path 15 leading from an exhaust path 13 of the first suction path 10 to a connection 40, and the external exhaust path 14.

The first suction path 10 sucks toner T. In some cases, a part of the ozone G, which is a gas, is sucked together with the toner T. Therefore, a controller 41 controls the third switching valve 72 to switch the path to the path 15 leading from the exhaust path 13 of the first suction path 10 to the connection 40 when the amount of the ozone G detected by the ozone sensor 71 is a third predetermined amount or more, and switch the path to the external exhaust path 14 when the amount of the ozone G detected by the ozone sensor 71 is less than the third predetermined amount. That is, the controller 41 functions as a switching controller. In the first suction path 10, when the ozone G of the third predetermined amount or more is not detected, the path 15 leading to the connection 40 is closed and the air is directly discharged to an outside of the apparatus. The third predetermined amount is stored in advance in a storage unit 45.

Next, an operation of the image forming apparatus 400 according to the fourth embodiment will be described.

Figure 9:
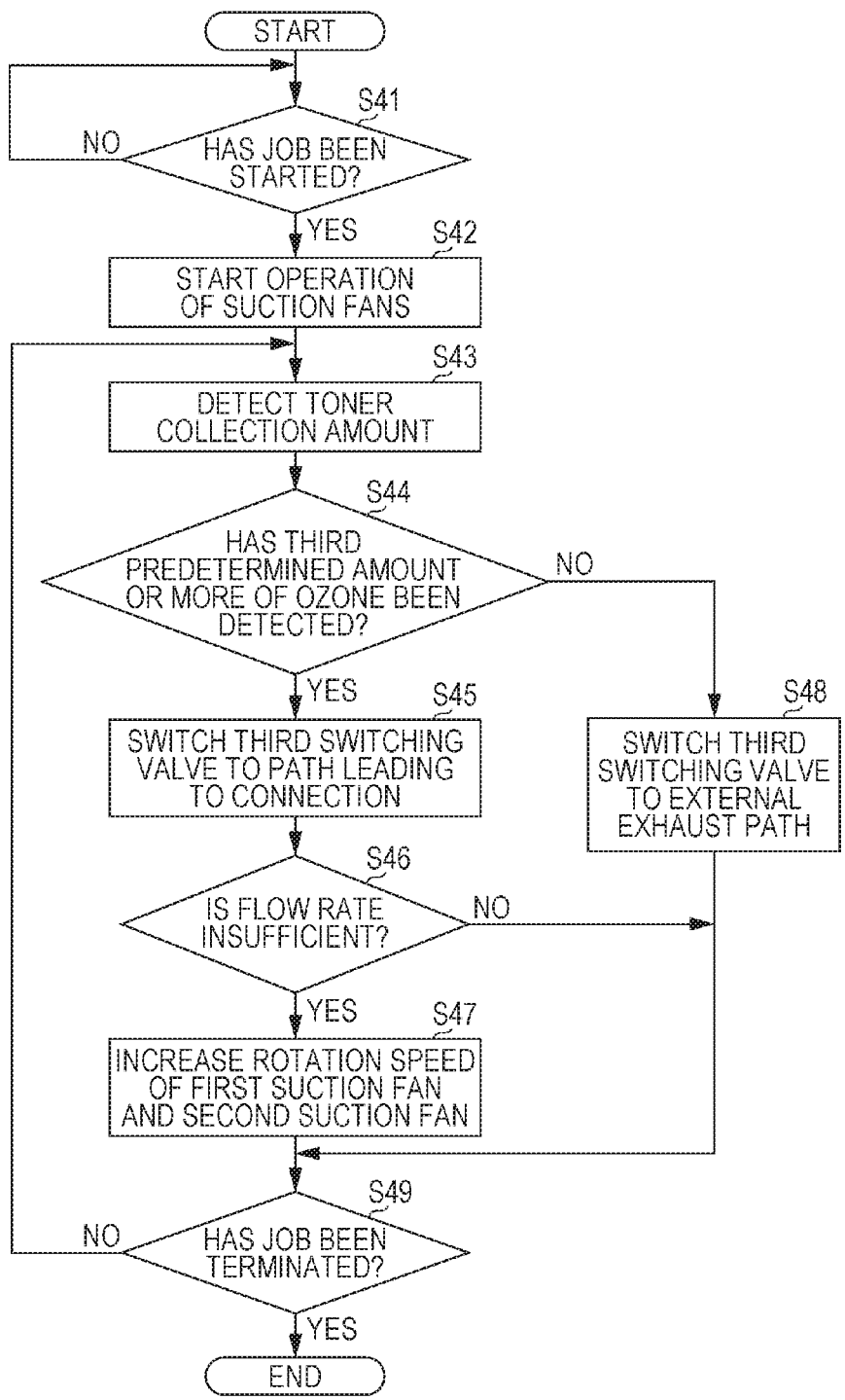
FIG. 9 is a flowchart illustrating a fourth suction process.
Figure 10:
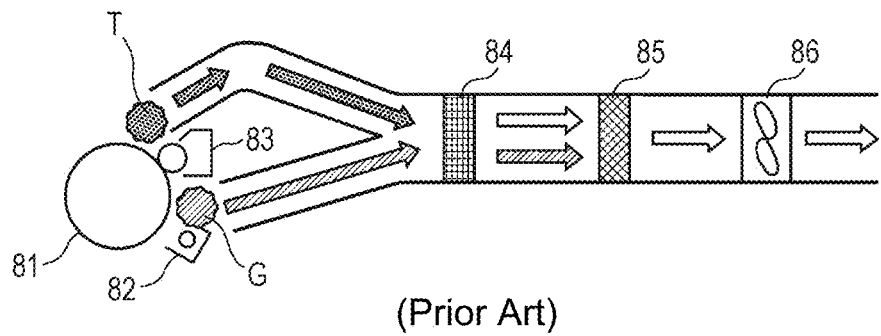
FIG. 10 is a schematic diagram illustrating a conventional configuration A.
Figure 11:
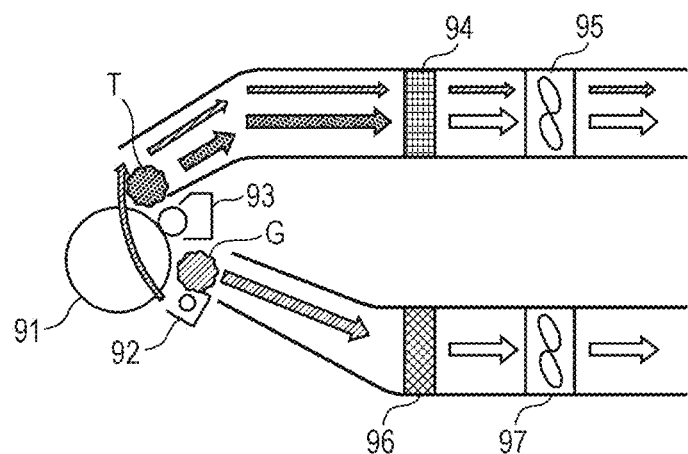
FIG. 11 is a schematic diagram illustrating a conventional configuration B.

FIG. 9 is a flowchart illustrating a fourth suction process executed by the image forming apparatus 400.

Since processes in steps S41 to S43 are similar to the processes in steps S1 to S3 in FIG. 3, description is omitted.

After step S43, the controller 41 determines whether the amount of the ozone G detected by the ozone sensor 71 is the third predetermined amount or more in the upstream of the toner filter 11 of the first suction path 10 (step S44).

When the amount of the ozone G detected by the ozone sensor 71 is the third predetermined amount or more (YES in step S44), the controller 41 controls the third switching valve 72 to switch the state to a state connected to the path 15 leading from the exhaust path 13 of the first suction path 10 to the connection 40 (step S45).

In a case where the exhaust path 13 of the first suction path 10 is originally connected to the path 15 leading to the connection 40, the state of the third switching valve 72 may remain unchanged.

Since processes in steps S46 and S47 are similar to the processes in steps S4 and S5 in FIG. 3, description is omitted.

In step S44, when the amount of the ozone G detected by the ozone sensor 71 is less than the third predetermined amount (NO in step S44), the controller 41 controls the third switching valve 72 to switch the state to a state where the exhaust path 13 of the first suction path 10 is connected to the external exhaust path 14 (step S48).

When the exhaust path 13 of the first suction path 10 is originally connected to the external exhaust path 14, the state of the third switching valve 72 may remain unchanged.

In step S46, when the flow rates in the first suction path 10 and the second suction path 20 are not insufficient (NO in step S46), after the step S47, or after the step S48, the controller 41 determines whether the job has been terminated (step S49). When the job has not been terminated (NO in step S49), the process is returned to step S43 and is repeated.

In step S49, when the job has been terminated (YES in step S49), the fourth suction process is terminated.

As described above, according to the image forming apparatus 400 of the fourth embodiment, the connection destination of the exhaust path 13 of the first suction path 10 is switched to the external exhaust path 14 through which the air is directly discharged to the outside of the apparatus when the ozone G in the first suction path 10 is less than the third predetermined amount, whereby the second suction fan 22 can be used to suck only the air in the second suction path 20, in addition to a similar effect to the first embodiment. Therefore, at the time of closing of the path 15 leading from the exhaust path 13 of the first suction path 10 to the connection 40, the rotation speed of the second suction fan 22 can be reduced and power consumption can be suppressed.

Although embodiments of the present invention have been described and illustrated in detail, the disclosed embodiments are made for purposes of illustration and example of the image forming apparatus according to the present invention only and not limitation. The scope of the present invention should be interpreted by terms of the appended claims. The detailed configurations of the units that configure the apparatus and the detailed operations can be appropriately changed without departing from the gist of the present invention.

For example, the characteristic configurations of the embodiments may be combined.

Further, in the embodiments, the toner has been described as an example of the dust to be sucked. However, the dust to be sucked may be paper powder or the like. Further, in the embodiments, the ozone has been described as an example of the gas to be sucked. However, the gas to be sucked may be volatile organic compounds (VOC), nitrogen oxide (NOx), or the like.

What is claimed is:

1. An image forming apparatus comprising:
   a first suction path for sucking and recovering dust from a place where the dust is generated; and
   a second suction path for sucking and recovering a predetermined gas from a place where the gas is generated, wherein
   the first suction path includes a first filter that collects the dust, a first suction fan provided downstream of the first filter, and an exhaust path of the first suction path,
   the second suction path includes a second filter that collects the gas, a second suction fan provided downstream of the second filter, and an exhaust path of the second suction path, and
   a connection in which the exhaust path of the first suction path is connected upstream of the second filter in the second suction path is included.

2. The image forming apparatus according to claim 1, wherein
   a flow rate of the second suction fan is larger than a flow rate of the first suction fan.

3. The image forming apparatus according to claim 1, further comprising:
   a dust collection amount detector that detects an amount of the dust collected by the first filter; and
   a fan controller that changes a rotation speed of the first suction fan and/or a rotation speed of the second suction fan according to the amount of the dust detected by the dust collection amount detector.

4. The image forming apparatus according to claim 1, further comprising:
a third suction path including a third suction fan for discharging a gas in the apparatus to an outside of the apparatus;
a first bypass path branching from the exhaust path of the second suction path and joining upstream of the third suction fan in the third suction path; and
a first switch that switches a path leading from the exhaust path of the second suction path to the outside of the apparatus, and the first bypass path.

5. The image forming apparatus according to claim 4, wherein
a flow rate of the third suction fan is larger than a flow rate of the second suction fan.

6. The image forming apparatus according to claim 1, further comprising:
a shutter that changes an opening area of a path upstream of the connection in the second suction path.

7. The image forming apparatus according to claim 4, further comprising:
a second bypass path branching upstream of the shutter in the second suction path and joining upstream of the first filter in the first suction path; and
a second switch that switches a path leading from a branch position upstream of the shutter in the second suction path to the shutter, and the second bypass path.

8. The image forming apparatus according to claim 7, comprising:
a gas detector provided upstream of the first filter in the first suction path, and which detects an amount of the gas;
an external exhaust path branching from the exhaust path of the first suction path and leading to an outside of the apparatus;
a third switch that switches a path leading from the exhaust path of the first suction path to the connection, and the external exhaust path; and
a switching controller that switches a path to the path leading from the exhaust path of the first suction path to the connection when the amount of the gas detected by the gas detector is a predetermined amount or more, and switches a path to the external exhaust path when the amount of the gas is less than the predetermined amount.

9. The image forming apparatus according to claim 1, wherein
the dust is toner, and
the first suction path has an opening near a developer or a cleaner that removes the toner from an image carrier.

10. The image forming apparatus according to claim 1, wherein
the predetermined gas contains at least one of ozone, VOC, and NOx, and
the second suction path has an opening near a charger that charges an image carrier.

* * * * *